United States Patent
Norris (10) Patent No.: US 9,498,815 B2
(45) Date of Patent: Nov. 22, 2016

(54) APPARATUS FOR FLARING A DOUBLE-WALLED TUBE

(71) Applicant: Electro-Motive Diesel, Inc., LaGrange, IL (US)

(72) Inventor: Nicholas D. Norris, Chicago, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 47 days.

(21) Appl. No.: 14/568,343

(22) Filed: Dec. 12, 2014

(65) Prior Publication Data

US 2016/0167102 A1    Jun. 16, 2016

(51) Int. Cl.
| | | |
|---|---|---|
| *B21C 37/12* | (2006.01) | |
| *B21D 41/02* | (2006.01) | |
| *B29C 57/04* | (2006.01) | |
| *B29C 49/24* | (2006.01) | |
| *B21D 39/04* | (2006.01) | |

(52) U.S. Cl.
CPC ............. *B21D 41/021* (2013.01); *B21D 39/04* (2013.01); *B29C 49/24* (2013.01); *B29C 57/045* (2013.01)

(58) Field of Classification Search
CPC ..... B29C 49/24; B29C 57/045; B21D 39/04; B21D 41/021
USPC .......................................................... 72/454
See application file for complete search history.

(56) References Cited

U.S. PATENT DOCUMENTS

| | | | |
|---|---|---|---|
| 1,560,186 A | | 11/1925 | Muth |
| 1,835,179 A | | 12/1931 | Rue |
| 3,230,613 A | * | 1/1966 | Rechin ................. F02K 9/972 239/127.3 |
| 4,198,365 A | * | 4/1980 | Pelton .................. B29C 49/24 264/249 |
| 4,223,545 A | * | 9/1980 | Tucholski ........... B21D 41/021 72/206 |
| 4,934,038 A | | 6/1990 | Caudill |
| 7,025,384 B2 | * | 4/2006 | Whitehead et al. .. F16L 55/165 285/247 |
| 7,604,472 B2 | | 10/2009 | Hayes, Jr. et al. |
| 7,669,328 B1 | * | 3/2010 | Wake ................... B21D 39/04 29/507 |

FOREIGN PATENT DOCUMENTS

JP    2004025221    1/2004

* cited by examiner

Primary Examiner — David B Jones (57) ABSTRACT

An apparatus for flaring an outer tube of a double-walled tube is provided. The apparatus includes a frame, a flaring tool and a clamping arrangement. The frame includes a first portion and a second portion that is laterally disposed in relation to the first portion. The clamping arrangement is disposed on the first portion. The clamping arrangement is configured to receive the double-walled tube therein and position an end of the double-walled tube to face the second portion. The clamping arrangement is operable to axially restrict the double-walled tube. The flaring tool is disposed in an axially movable engagement with respect to the second portion. The flaring tool includes a flaring tip that defines a tapered portion. The tapered portion is configured to face the end of the double-walled tube and flare an end of the outer tube.

19 Claims, 6 Drawing Sheets

FIG. 6

APPARATUS FOR FLARING A DOUBLE-WALLED TUBE

TECHNICAL FIELD

The present disclosure generally relates to an apparatus for flaring a double-walled tube. More particularly, the present disclosure relates to an apparatus for sequentially flaring an outer tube and an inner tube of the double-walled tube.

BACKGROUND

Hydraulic arrangements used in various industrial and commercial applications may employ tubes to transport fluids from one location to another. Typically, tubes come in definite lengths and, in order to accomplish fluid transportation from one location to another, many tubes may need to be joined or coupled successively at their ends so as to provide a continuous flow-path to the fluids. One way to couple the double-walled tubes is by using a coupler over the ends of adjacently located tubes. As such, in some cases, tubes using couplers may additionally require flaring in order to allow fitment with the coupler.

For reference, U.S. Pat. No. 7,604,472 relates to a method for forming a flare in an end of a tube. The method includes heating the end of the tube to a near-melted state and inserting the end of the tube into a flare-forming die with a flare forming portion. Further, a mandrel is pressed into the end of the tube for pressure forming the flare in the end of the tube.

SUMMARY OF THE DISCLOSURE

In one aspect of the present disclosure, an apparatus for flaring an outer tube of a double-walled tube includes a frame, a clamping arrangement, and a flaring tool. The frame has a first portion and a second portion. The second portion is laterally disposed in relation to the first portion. The clamping arrangement is disposed on the first portion. The clamping arrangement is configured to receive the double-walled tube therein and position an end of the double-walled tube to face the second portion. Further, the clamping arrangement is operable to axially restrict the double-walled tube. The flaring tool is disposed in an axially movable engagement with respect to the second portion. The flaring tool includes a flaring tip. The flaring tip defines a tapered portion that is configured to face the end of the double-walled tube and flare an end of the outer tube.

In another aspect of the present disclosure, the apparatus includes the frame, the clamping arrangement, and a flaring tool. The flaring tool is disposed in an axially movable engagement with respect to the second portion. The flaring tool includes a flaring tip that defines a tapered portion. The tapered portion is configured to face the end of the double-walled tube and flare an end of the outer tube. The flaring tool further defines a central recess to allow passage of an inner tube of the double-walled tube therethrough.

In yet another aspect of the present disclosure, a method of manufacturing a flaring tool includes providing a tapered portion on the flaring tool and defining a central recess adjacent to the tapered portion such that the tapered portion is configured to interface with the outer tube. The central recess has a diameter that is lesser than an inner diameter of the outer tube and greater than an outer diameter of the inner tube.

Other features and aspects of this disclosure will be apparent from the following description and the accompanying drawings.

DETAILED DESCRIPTION

Figure 1:
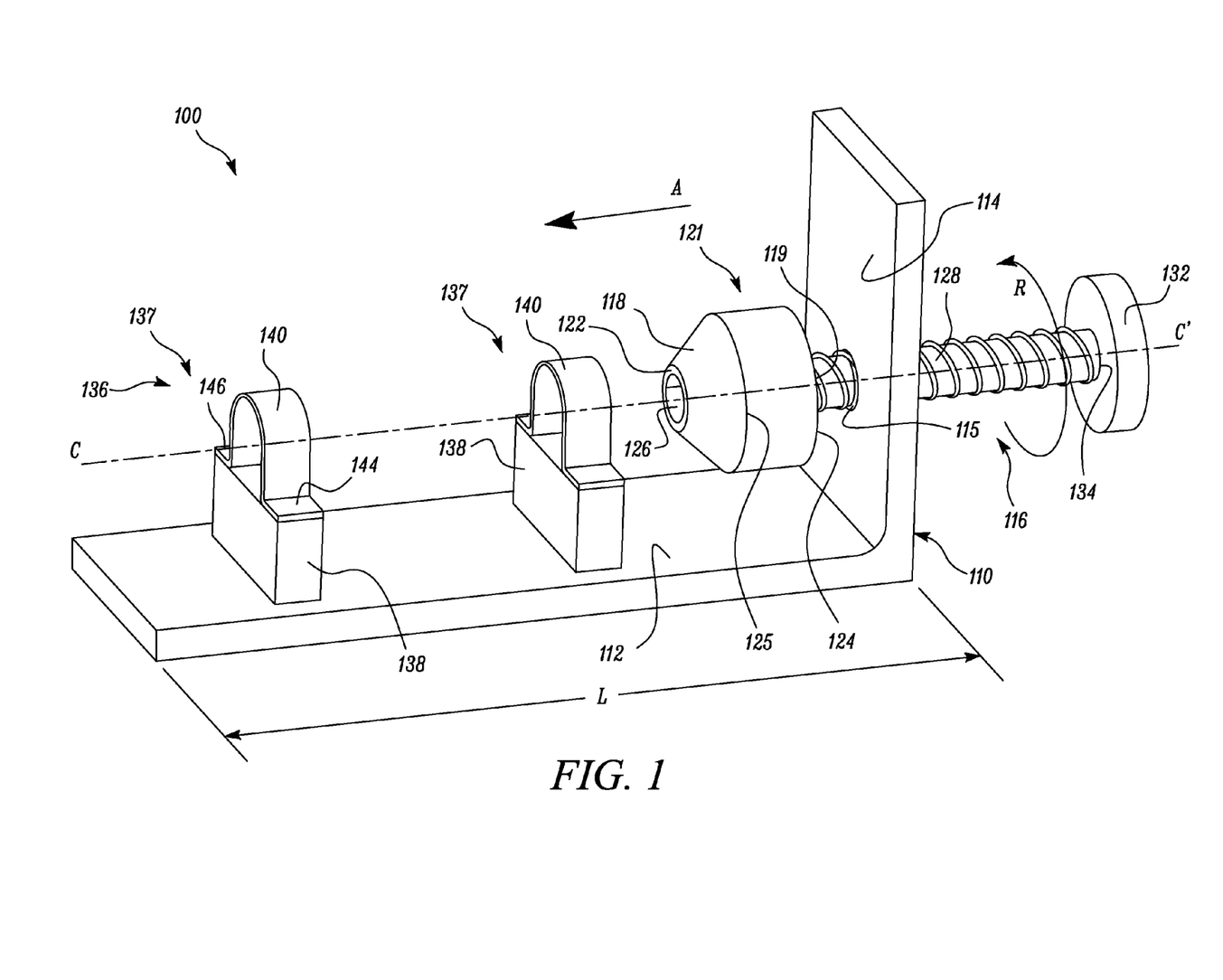
FIG. 1 is a perspective view of an apparatus, in accordance with an embodiment of the present disclosure, that can be used in sequentially flaring an outer tube, and an inner tube of a double-walled tube.

The present disclosure generally relates to an apparatus for flaring a double-walled tube. More particularly, the present disclosure relates to an apparatus for sequentially flaring an outer tube and an inner tube of a double-walled tube. FIG. 1 illustrates an apparatus 100 in accordance with an embodiment of the present disclosure. In the illustrated embodiment, the apparatus 100 is employed to flare an inner tube 104 and an outer tube 106 of a double-walled tube 102 (See FIG. 2).

The double-walled tube 102 may form part of a fluid system that is located between heat exchanging units of a HVAC system (heating, ventilation, and air-conditioning) (not shown). Alternatively the double-walled tube 102 may be employed for transportation of fluids in a boiler system. Optionally, the double-walled tube 102 may be employed in an engine fuel system.

Although a HVAC system, the boiler system, and the engine fuel system are disclosed herein, it is to be noted that an environment or application in which the double-walled tube 102 is used is non-limiting of this disclosure. One of ordinary skill in the art will acknowledge that the double-walled tube 102 can alternatively be employed in hydraulic and/or pneumatic arrangements of other commonly known industrial applications.

Figure 2:
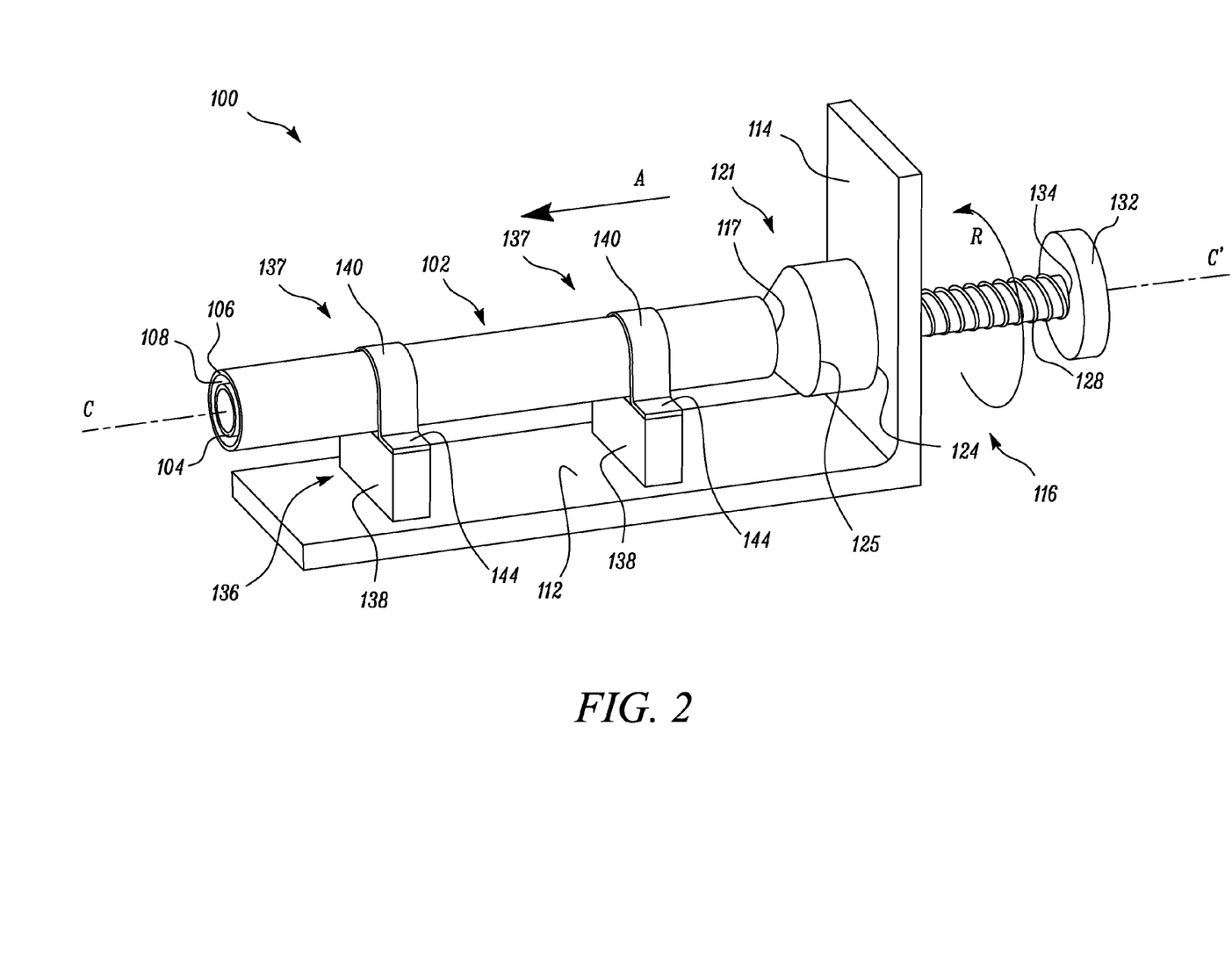
FIG. 2 is a perspective view of the apparatus showing the double-walled tube positioned for flaring operation.

Referring to FIG. 2, the double-walled tube 102 includes the inner tube 104 and the outer tube 106 that are disposed about an axis C-C'. Moreover, as shown, the inner tube 104 and the outer tube 106 are separated to define an annular space 108 therebetween.

The apparatus 100 includes a frame 110 having a first portion 112 and a second portion 114. The first portion 112 is disposed substantially parallel to the axis C-C', while the second portion 114 is laterally disposed in relation to the first portion 112. The second portion 114 defines an aperture 115 therein.

The apparatus 100 also includes a flaring tool 116. The flaring tool 116 includes a threaded shank 128 that is rotatably disposed in the aperture 115. The second portion defines a threaded receptacle (not shown) disposed adjacent to the aperture 115. The threaded receptacle is configured to threadably engage and hence, couple with the threaded shank 128. As such, the threaded shank 128 and the threaded receptacle are configured to mutually co-operate and bring about an axial movement of the flaring tool with respect to the second portion 114.

Figure 3:
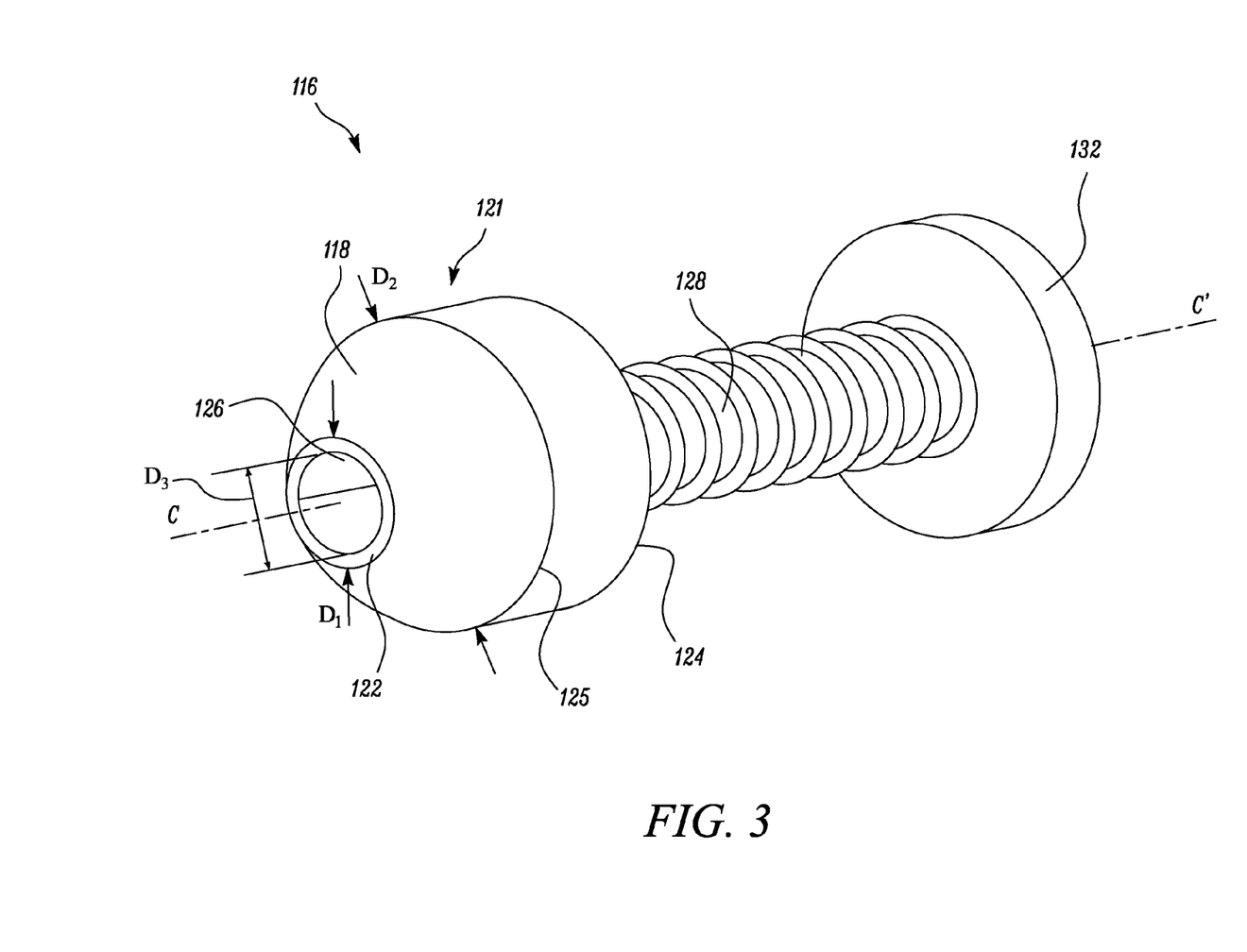
FIG. 3 is a perspective view of a flaring tool that can be employed to flare the outer tube of the double-walled tube.

Referring to FIG. 3, a handle 132 is disposed at a free end 134 of the threaded shank 128. The handle 132 may be rotated to facilitate axial movement of the flaring tool 116 relative to the second portion 114. In the illustrated embodiment, the handle 132 is disc-shaped. However, the handle 132 may be implemented by way of other shapes and/or structures for e.g., a hand wheel, a knob or any other suitable structures known in the art. As shown in FIG. 2, the handle 132 may be rotated in a first direction R to axially move the flaring tool 116 towards the double-walled tube 102 i.e., in an axial direction A. Alternatively, a motor (not shown) having a drive shaft may be employed by the apparatus 100, wherein the shaft is connected to the free end 134 of the threaded shank 128 to axially move the flaring tool 116 towards the double-walled tube 102. Therefore, although a handle is disclosed herein, one of ordinary skill in the art will appreciate that the apparatus 100 of the present disclosure may be configured to employ manual effort or a power source to accomplish the axial movement of the flaring tool 116 relative to the double-walled tube 102.

The flaring tool 116 also includes a flaring tip 121 removably coupled to the threaded shank 128. The flaring tool 116 has a first end 122 and a second end 124. Referring to FIG. 2, the first end 122 is disposed proximal to an end 123 of the outer tube 106. The second end 124 is distally located from the end 123 of the outer tube 106. The second end 124 of the flaring tip 121 is disposed on another end 119 of the threaded shank 128.

Figure 4:
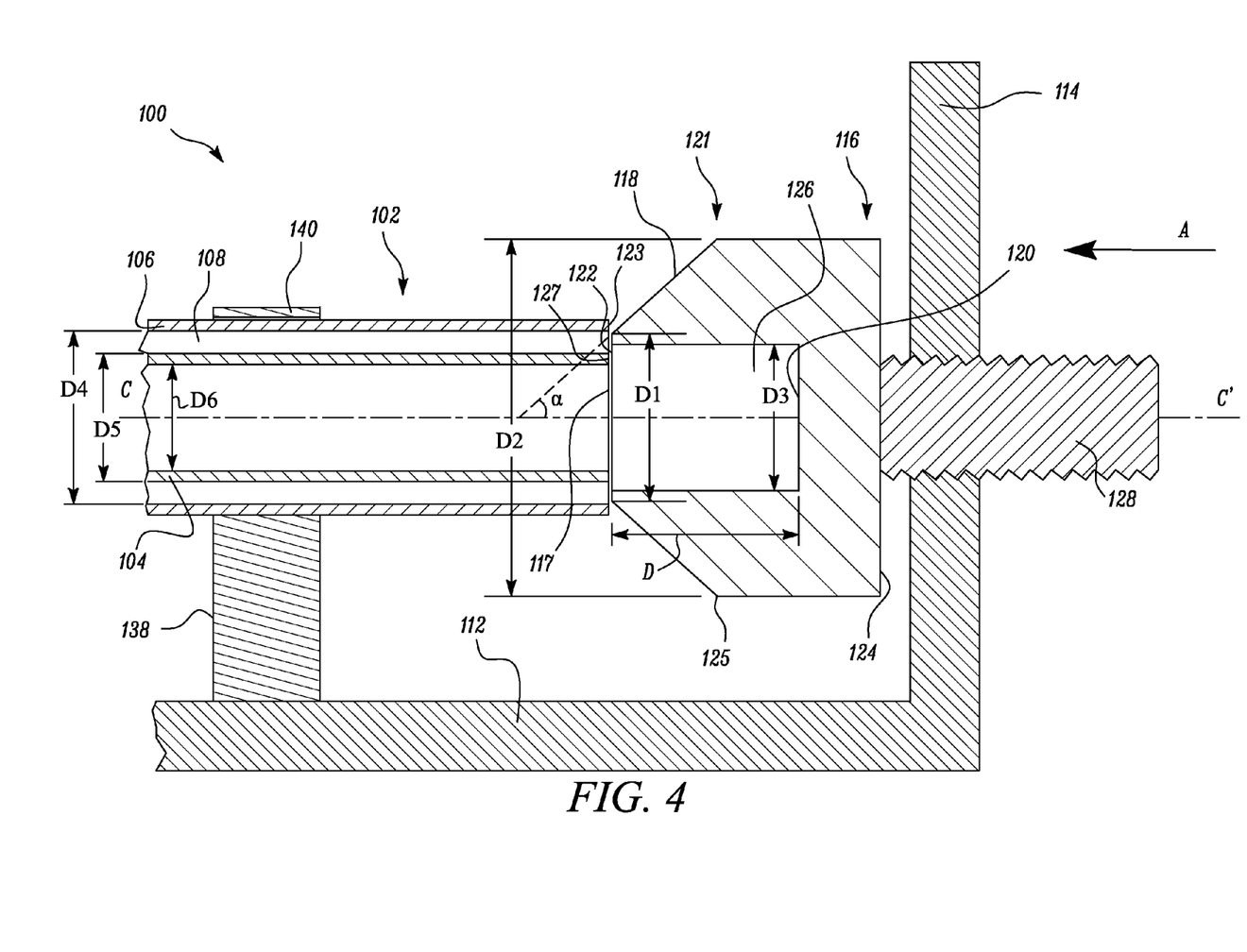
FIG. 4 is a front sectional view of the apparatus showing various diameters of a flaring tip relative to diameters of the inner tube and the outer tube.

The flaring tip 121 defines a tapered portion 118 adjacent to the first end 122 thereof. A diameter of the tapered portion 118 progressively increases with distance from the first end 122 i.e., towards an opposing end 125 of the tapered portion 118. As illustrated in FIG. 4, the tapered portion 118 subtends an angle 'α' about the axis C-C'. A value of the angle 'α' is characterized by the relative diameters D1, D2 defined by the ends 122, 125 of the tapered portion 118. The tapered portion 118 is configured to face an end 117 of the double-walled tube 102 and flare the end 123 of the outer tube 106.

The flaring tip 121 also defines a central recess 126 that is disposed about the axis C-C' and located adjacent to the first end 122. A diameter D3 of the central recess 126 is smaller than a diameter D2 of the first end 122 of the flaring tip 121. Moreover, the diameter D3 of the central recess 126 is lesser than an inner diameter D4 of the outer tube 106 and greater than an outer diameter D5 of the inner tube 104. Therefore, the central recess 126 is configured to receive the inner tube 104 therethrough. As the flaring tool 116 is moved towards the double-walled tube 102, i.e., along the axial direction A, the inner tube 104 may pass through the central recess 126. Further, a depth D of the central recess 126 may be kept sufficiently large so as to prevent an end 127 of the inner tube 104 from abutting with an end wall 120 of the central recess 126 during the flaring operation.

With continued reference to FIG. 4, the diameter D1 of the first end 122 of the flaring tip 121 is lesser than the inner diameter D4 of the outer tube 106 whereas the diameter D2 of the second end 124 is greater than the inner diameter D4. As the handle 132 is rotated in the first direction R, the flaring tip 121 moves towards the double-walled tube 102 in the axial direction A. Moreover, as the flaring tip 121 applies a tangential force on the outer tube 106, the outer tube 106 is deformed in an outward direction i.e., away from the axis C-C'.

Figure 5:
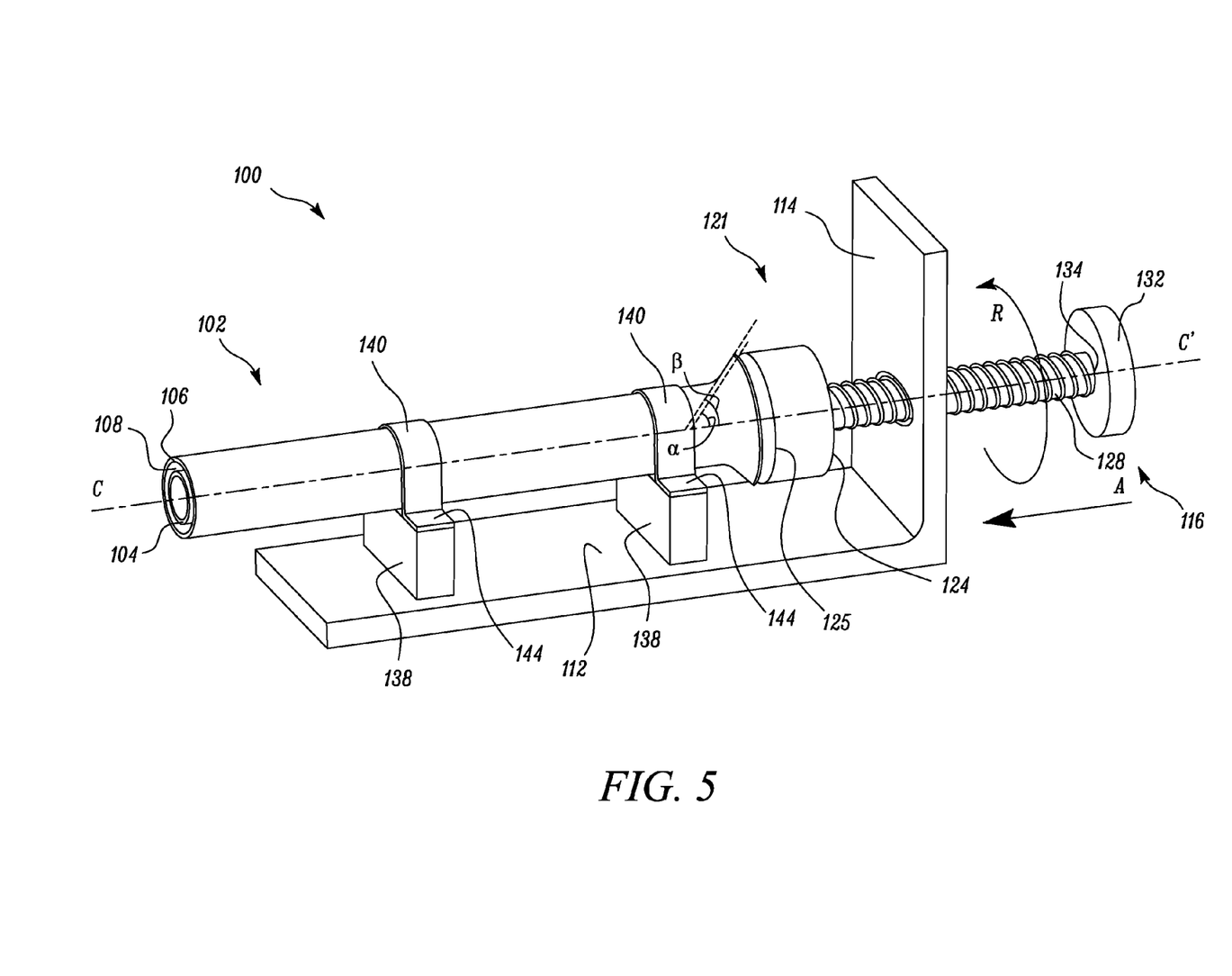
FIG. 5 is a perspective view of the apparatus at an instant when flaring operation is performed in the outer tube.

Referring to FIG. 5, the outer tube 106 is flared at an angle β. The angle of flare β may be substantially equal to the angle α of the tapered portion 118. Upon further rotation of the handle 132 in the first direction R, a depth of flare in the outer tube 106 may be increased.

Further, depending on the relative diameters of the outer and inner tubes 106, 104 and/or the angle of flare β required in the outer tube 106, one of ordinary skill in the art will acknowledge that suitably tapered and/or suitably sized flaring tips may be selected for use with in the apparatus 100. While flaring the outer tube 106, the double-walled tube 102 is held in position by a clamping arrangement 136.

The clamping arrangement 136 is disposed on the first portion 112 of the frame 110. The clamping arrangement 136 is configured to receive the double-walled tube 102 therein and also position the end 123 of the outer tube 106 so as to face the first end 122 of the flaring tip 121. In the illustrated embodiment, the clamping arrangement 136 may include a series of clamps 137. Each of the clamps 137 has a base 138 and a bracket 140 releasably connected to the base 138. In the embodiment of FIG. 5, two bases 138 are shown spaced apart from each other and disposed partway along a length L of the first portion 112. The base 138 may be coupled to the first portion 112 by methods known in the art such as, but not limited to, welding, soldering, using fasteners and the like. The base 138 and the bracket 140 are configured to receive the double-walled tube 102 therebetween.

One end 144 of the bracket 140 may be pivotally connected to the base 138, for example, by providing a hinge joint. The other end 146 of the bracket 140 may be releasably fastened to the base 138 by suitable fasteners known in the art. Although one type of clamping arrangement is disclosed herein, a type of clamping arrangement is merely exemplary in nature and hence, non-limiting of this disclosure. One of ordinary skill in the art will acknowledge that other types of clamping arrangements may be employed in lieu of the clamping arrangement 136 disclosed herein.

For clarity in understanding of the present disclosure, a method of flaring the outer tube 106 of the double-walled tube 102 using the apparatus 100 will be explained hereinafter.

In order to flare the outer tube 106, one may select a suitably sized flaring tip 121 depending on the dimensions of the double-walled tube 102 to be flared and/or the angle of flare β required in the outer tube 106. The selected flaring tip 121 may be coupled to the threaded shank 128 and the double-walled tube 102 may be positioned in front of the flaring tip 121. The double-walled tube 102 is then secured to the apparatus 100 using the clamping arrangement 136 such that the double-walled tube 102 is axially restricted and hence, held in position.

Further, the handle 132 may be rotated in the first direction R to move the flaring tool 116 towards the outer tube 106. By rotating the handle 132, the tapered portion 118 may be brought into contact with the end 123 of the outer tube 106. Upon further rotation of the handle 132, the tapered portion 118 applies a tangential force on the outer tube 106 thereby deforming the outer tube 106 and defining the flare in an outward direction i.e., away from the axis C-C'. Moreover, the depth of the flare may be increased upon subsequent rotation of the handle 132 in the first direction R.

Further, if flaring is required in the inner tube, another flaring tip having a diameter less than an inner diameter D6 of the inner tube 104 is selected. In order to use the flaring tip having the lesser diameter, the flaring tip 121 may be removed prior to coupling of the flaring tip having the lesser diameter to the threaded shank 128. This flaring tip may now be coupled to the threaded shank 128 so as to face the end 127 of the inner tube 104. At this point, the handle 132 may be rotated to move the flaring tip against the inner tube 104 and bring about the flare in the inner tube 104.

Figure 6:
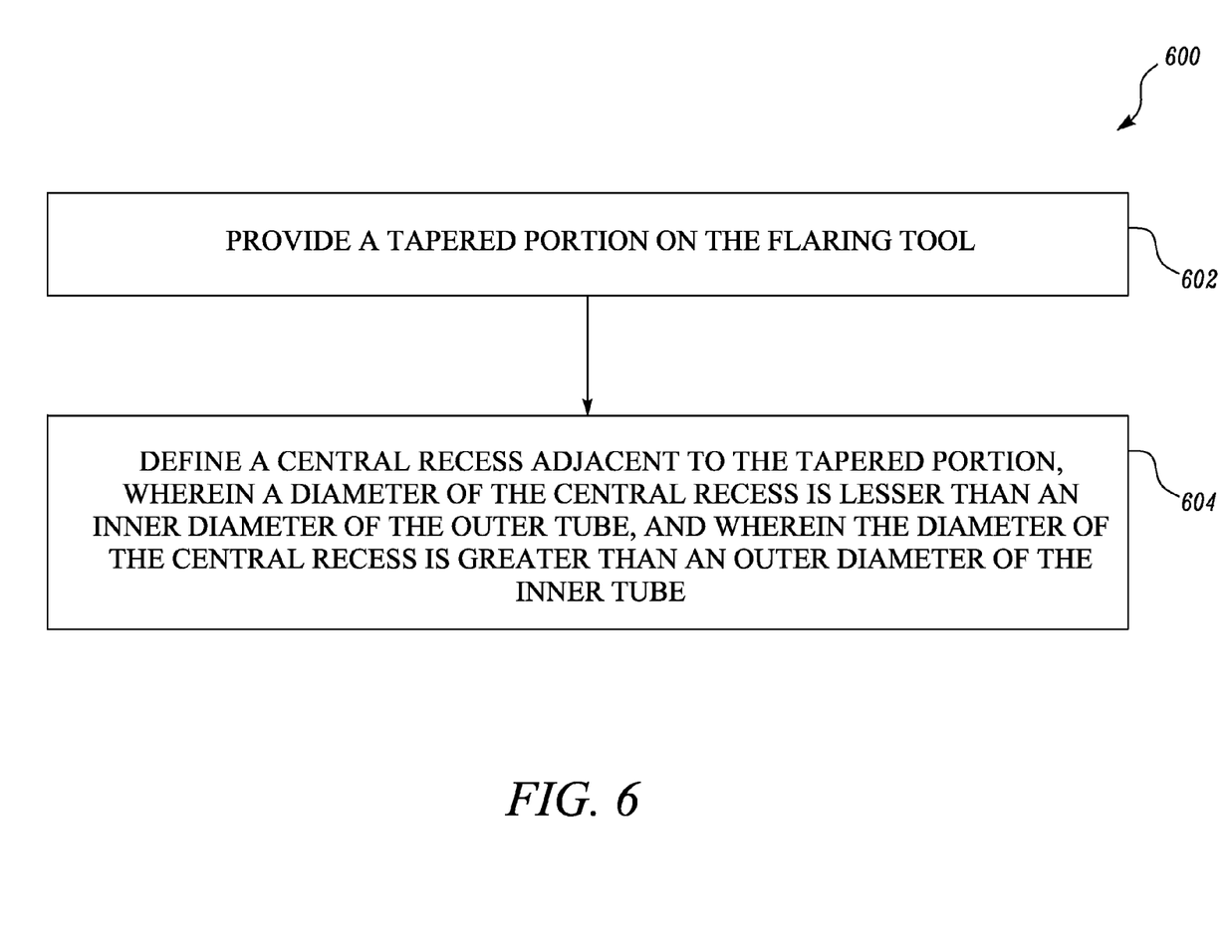
FIG. 6 is a flowchart of a method of manufacturing the flaring tool.

Referring to FIG. 6, a method 600 of manufacturing the flaring tool 116 is illustrated. At step 602, the method 600 includes providing the tapered portion 118 on the flaring tool 116 such that the tapered portion 118 is configured to interface with the end 123 of the outer tube 106. As such, the diameter D1 of the first end 122 of the flaring tip 121 is lesser than the inner diameter D4 of the outer tube 106 and the diameter D2 of the opposing end 125 of the tapered portion 118 is greater than the inner diameter D4 of the outer tube 106.

The tapered portion 118 on the flaring tip 121 formed by operations for e.g., taper turning or machining with use of other operations commonly known in the art.

At step 604, the method 600 includes defining the central recess 126 in the tapered portion 118 adjacent to the first end 122 of the flaring tip 121 such that the central recess 126 is configured to receive the inner tube 104 therein. Accordingly, the diameter D3 of the central recess 126 is lesser than the inner diameter D4 of the outer tube 106 and greater than the outer diameter D5 of the inner tube 104. As disclosed earlier herein, the depth D of the central recess 126 may be kept sufficiently large so as to prevent the end 127 of the inner tube 104 from abutting with the end wall 120 of the central recess 126 during the flaring operation. The central recess 126 may be defined in the tapered portion 118 adjacent to the first end 122 by commonly known methods such as, but not limited to drilling, boring and the like. Therefore, during the flaring operation, the inner tube 104 passes partway through the central recess 126 as the tapered portion 118 passes through the annular space 108 defined in the double-walled tube 102.

In methodologies directly or indirectly set forth herein, various steps and operations are described in one possible order of operation, but those skilled in the art will recognize that steps and operations may be rearranged, replaced, or eliminated without departing from the spirit and scope of the present disclosure as set forth in the claims.

Various embodiments disclosed herein are to be taken in the illustrative and explanatory sense, and should in no way be construed as limiting of the present disclosure. All directional references (e.g., inward, outward, radial, upper, lower, upward, downward, left, right, leftward, rightward, L.H.S, R.H.S, top, bottom, above, below, vertical, horizontal, clockwise, and counter-clockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, engaged, connected, and the like) are to be construed broadly. Moreover, such joinder references do not necessarily infer that two elements are directly connected to each other.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functionalities of components, such features may be omitted from the scope of the present disclosure without departing from the spirit of the present disclosure as defined in the appended claims.

INDUSTRIAL APPLICABILITY

The present disclosure has applicability for implementation and use in flaring of tubes that can be used in various industrial settings such as, but not limited to, HVAC, engine fuel systems, manufacturing, hydraulics, pneumatics, refineries, power plants, construction, and other applications known to one skilled in the art.

With use of the apparatus 100, the outer tube 106 and the inner tube 104 may be flared sequentially. The flaring tip 121 associated with the apparatus 100 is removably coupled to the threaded shank 128. As such, the present apparatus enables the flaring tips to be quickly and conveniently interchanged. Therefore, the flaring operation for double-walled tubes with different diameters may be performed easily by employing flaring tips of suitable size.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

I claim:

1. An apparatus for flaring an outer tube of a double-walled tube, the apparatus comprising:
    a frame having a first portion and a second portion, the second portion laterally disposed in relation to the first portion;
    a clamping arrangement disposed on the first portion, the clamping arrangement configured to receive the double-walled tube therein and position an end of the double-walled tube facing the second portion, wherein the clamping arrangement is operable to axially restrict the double-walled tube; and
    a flaring tool disposed in an axially movable engagement with respect to the second portion, the flaring tool including a flaring tip defining a tapered portion, the tapered portion configured to face the end of the double-walled tube and flare an end of the outer tube, wherein the flaring tip defines a central access extending at least partway from the first end to the second end, the central recess configured to allow passage of an inner tube of the double-walled tube therethrough.

2. The apparatus of claim 1, wherein the flaring tip includes:
    a first end disposed proximal to the end of the outer tube, wherein a diameter of the first end is lesser than an inner diameter of the outer tube; and
    a second end distally located from the end of the outer tube, wherein a diameter of the second end is greater than an inner diameter of the outer tube that is to be flared.

3. The apparatus of claim 1, wherein a diameter of the central recess is lesser than an inner diameter of the outer tube, and wherein the diameter of the central recess is greater than an outer diameter of the inner tube.

4. The apparatus of claim 1, wherein the first portion defines an aperture configured to receive the flaring tool therethrough.

5. The apparatus of claim 4, wherein the flaring tool includes a threaded shank rotatably disposed in the aperture.

6. The apparatus of claim 5, wherein the flaring tool includes a handle disposed at a free end of the threaded shank.

7. The apparatus of claim 1, wherein the clamping arrangement includes a series of clamps spaced apart from each other and disposed along a length of the first portion.

8. The apparatus of claim 7, wherein each of the clamps includes:
- a base; and
- a bracket having two ends, one of the ends being pivotally connected to the base, and the other of the ends configured to releasably engage with the base.

9. An apparatus for flaring an outer tube of a double-walled tube, the apparatus comprising:
- a frame having a first portion and a second portion, the second portion laterally disposed in relation to the first portion;
- a clamping arrangement disposed on the first portion, the clamping arrangement configured to receive the double-walled tube therein and position an end of the double-walled tube facing the second portion, wherein the clamping arrangement is operable to axially restrict the double-walled tube; and
- a flaring tool disposed in an axially movable engagement with respect to the second portion, the flaring tool including a flaring tip, the flaring tip:
- defining a tapered portion, the tapered portion configured to face the end of the double-walled tube and flare an end of the outer tube; and
- defining a central recess configured to allow passage of an inner tube of the double-walled tube therethrough.

10. The apparatus of claim 9, wherein the flaring tip includes:
- a first end disposed proximal to the end of the outer tube, wherein a diameter of the first end is lesser than an inner diameter of the outer tube; and
- a second end distally located from the end of the outer tube, wherein a diameter of the second end is greater than an inner diameter of the outer tube that is to be flared.

11. The apparatus of claim 9, wherein a diameter of the central recess is lesser than an inner diameter of the outer tube, and wherein the diameter of the central recess is greater than an outer diameter of the inner tube.

12. The apparatus of claim 9, wherein the first portion defines an aperture configured to receive the flaring tool therethrough.

13. The apparatus of claim 12, wherein the flaring tool includes a threaded shank rotatably disposed in the aperture.

14. The apparatus of claim 13, wherein the flaring tool includes a handle disposed at a free end of the threaded shank.

15. The apparatus of claim 9, wherein the clamping arrangement includes a series of clamps spaced apart from each other and disposed along a length of the first portion.

16. The apparatus of claim 15, wherein each of the clamps includes:
- a base; and
- a bracket having two ends, one of the ends being pivotally connected to the base, and the other of the ends configured to releasably engage with the base.

17. The apparatus of claim 9, wherein a depth of flare in the outer tube is increased by rotation of the flaring tool in a first direction.

18. A method of manufacturing a flaring tool for selectively flaring an outer tube of a double-walled tube, the method comprising:
- providing a tapered portion on the flaring tool, the tapered portion configured to interface with the outer tube;
- defining a central recess adjacent to the tapered portion, wherein a diameter of the central recess is lesser than an inner diameter of the outer tube, and wherein the diameter of the central recess is greater than an outer diameter of the inner tube.

19. The method of claim 18 further including:
- providing a first end to the tapered portion, wherein a diameter of the first end is lesser than an inner diameter of the outer tube; and
- providing a second end to the tapered portion, wherein a diameter of the second end is greater than an inner diameter of the outer tube that is to be flared.

* * * * *